United States Patent
Pulliam et al.

(10) Patent No.: US 10,204,310 B2
(45) Date of Patent: Feb. 12, 2019

(54) SYSTEM AND METHOD FOR HOME AUTOMATION

(71) Applicants: Jennifer Marie Pulliam, Dallas, TX (US); Samudra Sen, Lewisville, TX (US)

(72) Inventors: Jennifer Marie Pulliam, Dallas, TX (US); Samudra Sen, Lewisville, TX (US)

(73) Assignee: TXU Energy Retail Company LLC, Irving, TX (US)

( * ) Notice: Subject to any disclaimer, the term of this patent is extended or adjusted under 35 U.S.C. 154(b) by 256 days.

(21) Appl. No.: 14/992,419

(22) Filed: Jan. 11, 2016

(65) Prior Publication Data

US 2016/0209822 A1 Jul. 21, 2016

Related U.S. Application Data

(60) Provisional application No. 62/104,421, filed on Jan. 16, 2015.

(51) Int. Cl.
| | |
|---|---|
| *G06F 19/00* | (2018.01) |
| *G06Q 10/04* | (2012.01) |
| *G06Q 30/02* | (2012.01) |
| *G06Q 30/06* | (2012.01) |
| *G06Q 50/06* | (2012.01) |
| *G05B 15/02* | (2006.01) |

(52) U.S. Cl.
CPC ............. *G06Q 10/04* (2013.01); *G05B 15/02* (2013.01); *G06Q 30/0236* (2013.01); *G06Q 30/0631* (2013.01); *G06Q 50/06* (2013.01); *G05B 2219/2639* (2013.01); *G05B 2219/2642* (2013.01)

(58) Field of Classification Search
CPC ........... G05B 15/02; G05B 2219/2642; G05B 2219/2639; G06Q 10/04; G06Q 30/0631; G06Q 30/0236; G06Q 50/06
See application file for complete search history.

(56) References Cited

U.S. PATENT DOCUMENTS

| | | | |
|---|---|---|---|
| 9,183,207 B2 * | 11/2015 | Kay ...................... | G05B 19/042 |
| 9,261,863 B2 | 2/2016 | Sloop et al. | |
| 9,471,082 B2 | 10/2016 | Sloop et al. | |
| 2003/0158619 A1 * | 8/2003 | Carenini ............ | G05B 19/0421 |
| | | | 700/165 |

(Continued)

OTHER PUBLICATIONS

U.S. Appl. No. 61/589,639, filed Jan. 23, 2012 for Christopher Dale Sloop et al.—Jan. 23, 2012.
U.S. Appl. No. 14/992,508, filed Jan. 11, 2016, Pulliam et al.

*Primary Examiner* — Michael D Masinick
(74) *Attorney, Agent, or Firm* — Baker Botts L.L.P.

(57) ABSTRACT

An interface receives analyzed energy usage data, the analyzed energy usage data comprising information determined by one or more home automation devices. A processor applies optimization recommendation rules to the energy usage data. The processor determines an optimization recommendation, the optimization recommendation based on the analyzed energy usage data and the optimization recommendation rules. Upon a determination of the optimization recommendation, the interface further operable to communicate the optimization recommendation to a user.

22 Claims, 4 Drawing Sheets

(56) References Cited

U.S. PATENT DOCUMENTS

| | | | | |
|---|---|---|---|---|
| 2003/0216971 | A1* | 11/2003 | Sick | G01D 4/004 |
| | | | | 705/7.36 |
| 2006/0248165 | A1* | 11/2006 | Sridhar | H04L 41/5003 |
| | | | | 709/218 |
| 2008/0049779 | A1* | 2/2008 | Hopmann | H04L 12/2807 |
| | | | | 370/431 |
| 2011/0035524 | A1* | 2/2011 | Kydles | G06F 1/14 |
| | | | | 710/300 |
| 2011/0047046 | A1* | 2/2011 | Torres | G06Q 30/0603 |
| | | | | 705/26.41 |
| 2012/0054065 | A1* | 3/2012 | Sung | G06Q 30/02 |
| | | | | 705/26.7 |
| 2012/0101653 | A1* | 4/2012 | Tran | G01D 4/004 |
| | | | | 700/296 |
| 2013/0097053 | A1* | 4/2013 | Lee | G06Q 30/0631 |
| | | | | 705/26.7 |
| 2015/0061859 | A1 | 3/2015 | Matsuoka et al. | |
| 2015/0094968 | A1* | 4/2015 | Jia | G06Q 40/04 |
| | | | | 702/60 |
| 2015/0178804 | A1* | 6/2015 | Goad | G06Q 30/02 |
| | | | | 705/26.41 |
| 2015/0192911 | A1 | 7/2015 | Sloop et al. | |
| 2015/0229513 | A1* | 8/2015 | Mangaiahgari | H04W 4/001 |
| | | | | 709/221 |
| 2017/0364112 | A1* | 12/2017 | Templeton | H04L 12/2816 |

\* cited by examiner

SYSTEM AND METHOD FOR HOME AUTOMATION

RELATED APPLICATIONS

This application claims the benefit of priority of U.S. Provisional Patent Application No. 62/104,421 filed on Jan. 16, 2015.

TECHNICAL FIELD

This invention relates generally to management of home devices, and more particularly to home automation and energy procurement.

BACKGROUND

Users utilize devices at home for convenience or efficiency purposes. For example, users may monitor or control aspects of their home using home automation devices. In conventional systems, home automation devices offer limited feedback to the user or service provider.

Entities may make electrical procurement decisions. For example, electrical retail companies may make decisions regarding when and how much electricity to procure to meet the demands of its customers. In conventional systems, entities may make these decisions with limited data.

SUMMARY OF EXAMPLE EMBODIMENTS

According to embodiments of the present disclosure, disadvantages and problems associated with home automation and energy procurement may be reduced or eliminated.

In accordance with a particular embodiment of the present disclosure, an interface receives analyzed energy usage data, the analyzed energy usage data comprising information determined by one or more home automation devices. A processor applies optimization recommendation rules to the energy usage data. The processor determines an optimization recommendation, the optimization recommendation based on the analyzed energy usage data and the optimization recommendation rules. Upon a determination of the optimization recommendation, the interface further operable to communicate the optimization recommendation to a user.

In accordance with another embodiment of the present disclosure, a method for home automation includes: receiving, through an interface, analyzed energy usage data, the analyzed energy usage data comprising information determined by one or more home automation devices; applying, using a processor, service recommendation rules to the energy usage data; determining, using the processor, a service recommendation, the service recommendation based on the analyzed energy usage data and the service recommendation rules; and upon a determination of the service recommendation, communicating the service recommendation to a user.

Certain embodiments of the present disclosure may provide one or more technical advantages. A technical advantage of one embodiment includes increasing the efficiency of electricity usage using devices within or near a building or other structure. As another example, a technical advantage of one embodiment includes improving a user's convenience in operating devices within a building. As yet another example, a technical advantage includes creating an interaction between devices and service providers, which improves a user's experience. As a further example, a technical advantage of one embodiment includes improving the decisioning process for electricity procurement by providing data regarding energy usage.

Other technical advantages of the present disclosure will be readily apparent to one skilled in the art from the following figures, descriptions, and claims. Moreover, while examples of specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1-4, like numerals being used for like and corresponding parts of the various drawings.

Service providers offering home automation services may allow users to monitor or control home activities performed by a device. For example, a user may monitor or control home devices (e.g., a security camera, thermostat, garage door opener, pool pump, contact sensor, solar panel, water leak sensor, lock, light bulbs, and/or electricity usage monitor (e.g., a smart plug)). In conventional systems, home automation devices offer limited feedback to the user or service provider.

Service providers may make electrical procurement decisions. For example, electrical retail companies may make decisions regarding when and how much electricity to procure to suit its needs. In conventional systems, entities may make these decisions with limited data.

To facilitate providing recommendations to users or making electrical procurement recommendations, a service provider may receive data from home devices. Typically, one or more home devices communicate data to a third party and/or service provider for analysis. The teachings of this disclosure recognize that it would be desirable to provide a system that receives data from the home devices, analyzes the received data, and makes recommendations based, at least in part, on the data. For example, the recommendation may indicate a need to service one or more appliances, replace or acquire one or more appliances, or to switch rate plans. Further, the teachings of this disclosure recognize that it would be desirable to communicate the recommendations to users or a retail electricity provider. This provides the advantage of more efficient use of home devices, electricity usage, and electricity procurement.

Retail electrical providers make electricity procurement decisions, and may purchase electricity to provide electricity to its consumer base. Retail electrical providers may also wish to sell excess electricity if it is not needed for its consumer base. The teachings of this disclosure recognize that it would be desirable to utilize more information regarding consumers' current and future energy usage to facilitate procurement decisions. This disclosure recognizes that the additional usage information will allow retail electrical providers to more accurately predict the amount of electricity needed for its consumer base in a given time period. This provides the advantage of allowing retail electrical providers to make electricity procurement decisions more accurately. In some instances, more accurately predicting the electricity needed for a consumer base allows an electricity retailer to reduce its expenses.

Figure 1:
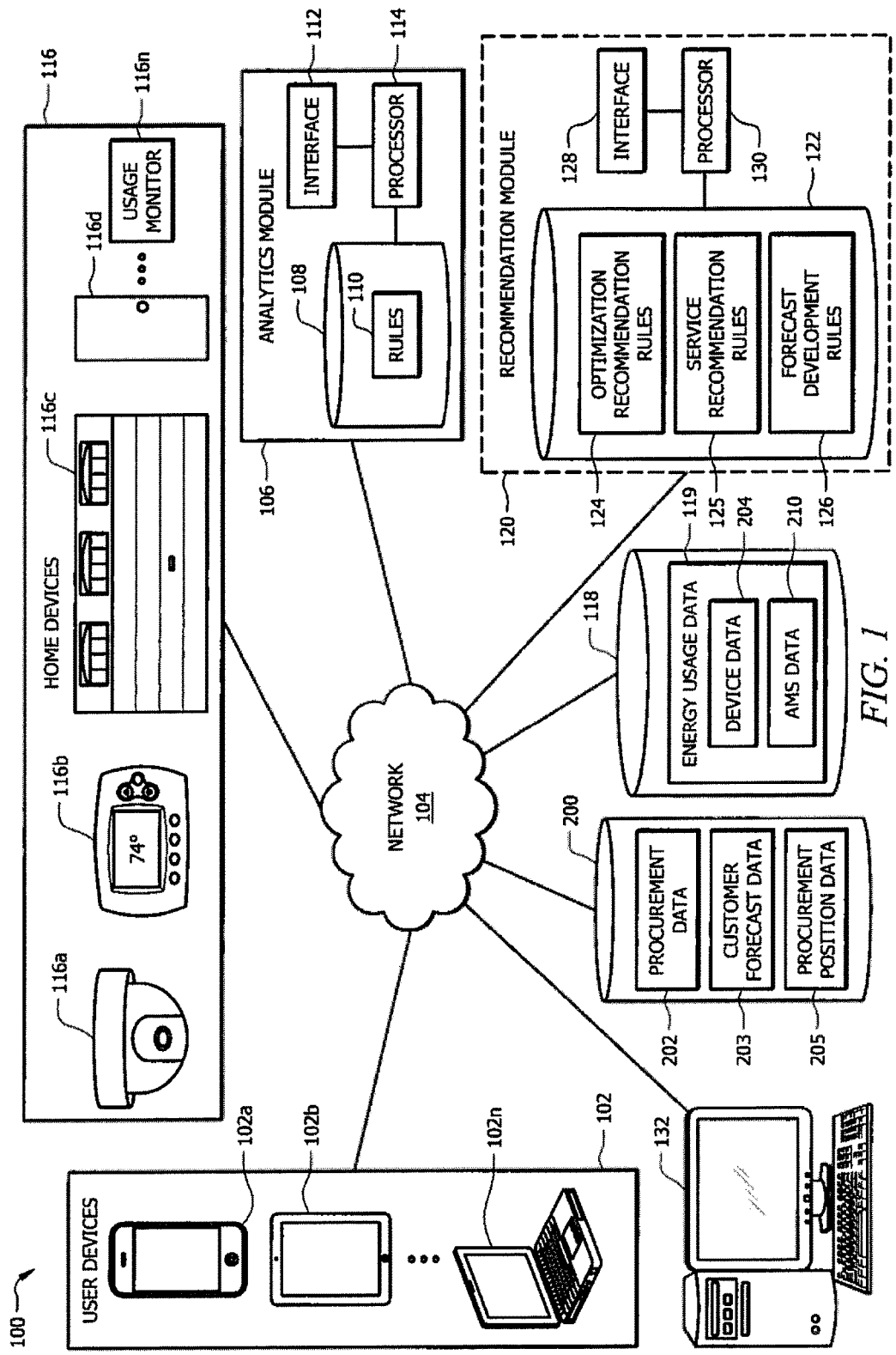
FIG. 1 illustrates a system for home automation.

FIG. 1 illustrates a system for home automation. More specifically, system 100 includes user devices 102, analytics module 106, home devices 116, recommendation module 120, computer 132, procurement database 200, and database 118 that may be communicatively coupled by network 104. Generally, user devices 102, analytics module 106, home devices 116, recommendation module 120, computer 132, procurement database 200, and database 118 interact to efficiently communicate and analyze data to make recommendations regarding electricity usage and procurement.

System 100 may include user devices 102a-102n, where n represents any suitable number. User devices 102 may represent any suitable device for use in system 100. For example, user devices 102 may be used to monitor home devices 116, respond to an optimization recommendation, a service recommendation, and/or an incentive offering, and/or facilitate an optimization or service recommendation. User devices 102 may include a database, a personal computer, a workstation, a laptop, a wireless or cellular telephone, an electronic notebook, a personal digital assistant, any other device capable of receiving, processing, storing, and/or communicating information, or any combination of the preceding.

System 100 includes home devices 116a-116m, where m represents any suitable number. System 100 may include any suitable number of home devices 116 executing any suitable operating system on any suitable platform. Home devices 116 may be located inside or near a user's home, office building, business, warehouse, vehicle, or any other location that allows for home devices 116 to communicate with user devices 102, analytics module 106, database 118, and/or recommendation module 120. In an embodiment, home devices 116 may include a security camera, a thermostat, a garage door indicator, a door lock indicator, an electrical usage monitor (e.g., a smart plug), a distributed or onsite generation monitor, a battery storage monitor, an electrical vehicle monitor, an HVAC monitor, a pool pump controller, a contact sensor, a solar panel, a water leak sensor, or any other suitable device for use in system 100. In some embodiments, home devices 116 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. In some embodiments, home devices 116 may operate on any suitable platform such as Wi-Fi, Bluetooth, Zigbee, a cellular platform, any other suitable platform, or any combination of the preceding. While depicted as home devices, home devices 116 may represent any suitable device that consumes electricity in any suitable location.

Generally, home devices 116 represent any suitable components to facilitate communicating energy usage data 119 to database 118 or analytics module 106. Additionally, home devices 116 may represent any components suitable to provide monitoring information to user devices 102. Home devices 116 may communicate with other components of system 100 via network 104. In an embodiment, one or more home devices 116 are controlled by one or more user devices 102 or any other suitable component of system 100. In a further embodiment, home devices 116 operate independently and automatically provide monitoring information to user device 102 or other components of system 100. Each home device 116 may communicate with user devices 102, analytics module 106, or other suitable components of system 100 independently. Further, two or more home devices 116 may communicate with the components of system 100 through a common interface, such as a home automation hub.

Network 104 facilitates communication between user devices 102, analytics module 106, home devices 116, recommendation module 102, and database 118. This disclosure contemplates any suitable network 104 operable to facilitate communication between the components of system 100. Network 104 may include any interconnecting system capable of transmitting audio, video, signals, data, messages, or any combination of the preceding. Network 104 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. This disclosure contemplates end networks having one or more of the described properties of network 104.

System 100 may include database 118. Database 118 may store, either permanently or temporarily, energy usage data 119 and/or any other suitable data. Database 118 includes any one or a combination of volatile or non-volatile local or remote devices suitable for storing information. For example, database 118 may include Random Access Memory ("RAM"), Read-only Memory ("ROM"), magnetic storage devices, optical storage devices, a cloud-based storage service, or any other suitable information storage device or combination of these devices. Database 118 may include any suitable information for use in the operation of analytics module 106, recommendation module 120, or any other suitable component of system 100. Additionally, database 118 may be a component external to analytics module 106. Database 118 may be located in analytics module 106, recommendation module 120, or any other location suitable for database 118 to communicate with the components of system 100. In an embodiment, database 118 includes energy usage data 119. In general, energy usage data 119 is data that indicates the amount of energy used and/or energy usage trends for one or more energy consumers. For example, energy usage data 119 may contain information regarding a user's electricity usage, usage habits, preferences, or any other suitable data. Energy usage data 119 may be supplied by energy consumers (e.g., through home automation devices 116) and/or one or more third party sources. In general, database 118 communicates energy usage data 119 to analytics module 106, recommendation module 120, and/or procurement database 200 via network 104.

In the illustrated embodiment, energy usage data 119 comprises device data 204 and Advanced Metering System ("AMS") data 210. In general, device data 204 comprises data received from one or more home devices 116. For example, device data 204 may contain information regarding a user's electricity usage, usage habits, preferences, or any other suitable data provided by home devices 116. In an embodiment, device data 204 may comprise one or more of time data, indoor temperature data, outdoor weather data, device schedule data, device run time data, device usage pattern data, device specification data, open/close sensor data, motion sensor data, video recording data, on/off device status data, device setting changes data, rate plan data, and consumer preference data. Device data 204 may be received from one or more home devices 116 and/or from analytics module 106. In an embodiment, device data 204 is received from analytics module 106. In this embodiment, rules 110 is applied to data communicated by one or more devices 116 to facilitate creating device data 204. While illustrated as stored in database 118, device data 204 may be stored in procurement database 200 and/or any other suitable component of system 100.

Energy usage data 119 may also comprise AMS data 210. In general, AMS data 210 comprises information from an electrical meter indicating the amount of electricity used. For example, the meter may be a digital solid-state meter that records electrical consumption in specific intervals. The meter may be equipped to communicate the data to database 118 where it is then stored as AMS data 210. Additionally, or alternatively, the meter or any other suitable component may communicate AMS data 210 to any other suitable component of system 100, such as procurement database 200. While illustrated as stored in database 118, AMS data 210 may be stored in procurement database 200 and/or any other suitable component of system 100.

System 100 may include procurement database 200. Procurement database 200 may store, either permanently or temporarily, procurement data 202, customer forecast data 203, procurement position data 205, and/or any other suitable data related to procuring electricity. Procurement database 200 includes any one or a combination of volatile or non-volatile local or remote devices suitable for storing information. For example, procurement database 200 may include Random Access Memory ("RAM"), Read-only Memory ("ROM"), magnetic storage devices, optical storage devices, or any other suitable information storage device or combination of these devices. Procurement database 200 may include any suitable information for use in the operation of analytics module 106, recommendation module 120, or any other suitable component of system 100. Additionally, procurement database 200 may be a component external to analytics module 106. Procurement database 200 may be located in analytics module 106, recommendation module 120, database 118, or any other location suitable for procurement database 200 to communicate with the components of system 100. In the illustrated embodiment, procurement database 200 comprises procurement data 202, customer forecast data 203, and procurement position data 205. Procurement database 200 is discussed in more detail in relation to FIG. 2. In general, procurement database 200 communicates procurement data 202, customer forecast data 203, and/or procurement position data 205 to recommendation module 120 via network 104.

System 100 includes analytics module 106. Analytics module 106 may include a network service, any suitable remote service, a mainframe, a host computer, a workstation, a web server, a personal computer, a file server, or any other suitable device operable to communicate with user devices 102, analytics module 106, home devices 116, recommendation module 120, database 118, procurement database 200, any other suitable component, or any combination of the preceding via network 104. In some embodiments, analytics module 106 may execute any suitable operating system such as IBM's zSeries/Operating System (z/OS), MS-DOS, PC-DOS, MAC-OS, WINDOWS, UNIX, Open-VMS, or any other appropriate operating systems, including future operating systems. The functions of analytics module 106 may be performed by any suitable combination of one or more servers or other components at one or more locations. In the embodiment where the modules are servers, the servers may be public or private servers, and each server may be a virtual or physical server. The server may include one or more servers at the same or at remote locations. Also, analytics module 106 may include any suitable component that functions as a server.

In the illustrated embodiment, analytics module 106 includes interface 112, processor 114, and memory 108. Interface 112 represents any suitable device operable to receive information from network 104, transmit information through network 104, perform suitable processing of the information, communicate to other devices, or any combination of the preceding. For example, interface 112 receives energy usage data 119 from database 118 or home devices 116. As another example, interface 112 communicates analyzed data to recommendation module 120. In another example, interface 112 communicates analyzed data to one or more user devices 102. Interface 112 represents any port or connection, real or virtual, including any suitable hardware and/or software, including protocol conversion and data processing capabilities, to communicate through a LAN, WAN, or other communication systems that allows analytics module 106 to exchange information with network 104, user devices 102, database 118, recommendation module 120, home devices 116, or any other suitable component of system 100.

Processor 114 controls the operation and administration of analytics module 106 by processing information received from interface 112 and memory 108. Processor 114 communicatively couples to interface 112 and memory 108. Processor 114 includes any hardware and/or software that operates to control and process information. For example, processor 114 may be a programmable logic device, a microcontroller, a microprocessor, any suitable processing device, or any suitable combination of the preceding.

Memory 108 may be a database that stores, either permanently or temporarily, received data, rules 110, any other suitable data, or any combination of the preceding. Memory 108 includes any one or a combination of volatile or non-volatile local or remote devices suitable for storing information. For example, memory 108 may include RAM, ROM, magnetic storage devices, optical storage devices, or any other suitable information storage device or combination of these devices. Memory 108 may include any suitable information for use in the operation of analytics module 106. Additionally, memory 108 may be a component external to reporting analytics module 106. Memory 108 may be located in analytics module 106 or any other location suitable for memory 108 to communicate with analytics module 106.

Memory 108 may include rules 110. Rules 110 generally refer to logic, rules, algorithms, code, tables, and/or other suitable instructions embodied in a computer-readable storage medium for performing the described functions and operations of analytics module 106. Generally, rules 110 facilitate analyzing energy usage data 119 received from database 118 or home devices 116 via network 104. For example, rules 110 may aggregate usage data provided over a period of time and/or received from a plurality of home devices 116. In an embodiment, rules 110 may transform the aggregated energy usage data into a format that may be processed by recommendation module 120. Recommendation module 120 may require data in a certain format, and analytics module 106 may transform the data into that format. As a further example, rules 110 may determine at what time or rate electrical components and/or appliances are utilized. While illustrated as including a particular module, rules 110 may include any suitable information for use in operation of analytics module 106. In general, analytics module 106 communicates the analyzed energy usage data to recommendation module 120 and/or user devices 102 via network 104.

As illustrated, system 100 includes recommendation module 120. Recommendation module 120 represents any suitable component that applies optimization recommendation rules 124, service recommendation rules 125, and/or forecast development rules 126 to data and makes forecasts and/or recommendations based on the application of the rules. Recommendation module 120 may include a network service, any suitable remote service, a mainframe, a host computer, a workstation, a web server, a personal computer, a file server, or any other suitable device operable to communicate with user devices 102, a retail electricity provider, home devices 116, database 118, procurement database 200, analytics module 106, any other suitable device, or any combination of the preceding. In some embodiments, recommendation module 120 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. The functions of recommendation module 120 may be performed by any suitable combination of one or more servers or other components at one or more locations. In the embodiment where the modules are servers, the servers may be public or private servers, and each server may be a virtual or physical server. The server may include one or more servers at the same or at remote locations. Also, recommendation module 120 may include any suitable component that functions as a server.

In the illustrated embodiment, recommendation module 120 includes interface 128, processor 130, and memory 122. Interface 128 represents any suitable device operable to receive information from network 104, transmit information through network 104, perform suitable processing of the information, communicate to other devices, or any combination of the preceding. For example, interface 128 transmits data to one or more user devices 102 or to a retail electricity provider. As another example, interface 128 receives analyzed energy usage data from analytics module 106 via network 104. As yet another example, interface 128 receives procurement data 202 from procurement database 200. Interface 128 represents any port or connection, real or virtual, including any suitable hardware and/or software, including protocol conversion and data processing capabilities, to communicate through a LAN, WAN, or other communication system that allows recommendation module 120 to exchange information with network 104, analytics module 106, home devices 116, user devices 106, and any other suitable components of system 100.

Processor 130 controls the operation and administration of recommendation module 120 by processing information received from interface 128 and memory 122. Processor 130 communicatively couples to interface 128 and memory 122. Processor 130 includes any hardware and/or software that operates to control and process information. For example, processor 130 may be a programmable logic device, a microcontroller, a microprocessor, any suitable processing device, or any suitable combination of the preceding.

Memory 122 may be a database that stores, either permanently or temporarily, received data, optimization recommendation rules 124, service recommendation rules 125, forecast development rules 126, any other suitable data, or any combination of the preceding. Memory 122 includes any one or a combination of volatile or non-volatile local or remote devices suitable for storing information. For example, memory 122 may include RAM, ROM, magnetic storage devices, optical storage devices, or any other suitable information storage device or combination of these devices. Memory 122 may include any suitable information for use in the operation of recommendation module 120. Additionally, memory 122 may be a component external to recommendation module 120. Memory 122 may be located in recommendation module 120 or any other location suitable for memory 122 to communicate with recommendation module 120.

In the illustrated embodiment, memory 122 includes optimization recommendation rules 124, service recommendation rules 125, and/or forecast development rules 126.

Optimization recommendation rules 124 generally refer to logic, rules, algorithms, code, tables, and/or other suitable instructions embodied in a computer-readable storage medium for performing the described functions and operations of recommendation module 120. Generally, optimization recommendation rules 124 are applied to the analyzed data received from analytics module 106 via network 104. Optimization recommendation rules 124 facilitate determining optimization recommendations to make to a user to, for example, improve electricity usage efficiency or suggest to the user upgrades or additional home devices 116 that will provide greater convenience and/or efficiency. For example, optimization recommendation rules 124 facilitate determining that, based on a user's electrical usage data, a different electrical service plan would benefit the user. In this example, recommendation module 120 may receive electricity service plans from a retail provider and compare the received usage data from home devices 116 to determine an optimized plan for the user. As another example, optimization recommendation rules 124 determine that, based on data received from an electrical vehicle monitor, a user should charge the electrical vehicle. As a further example, optimization recommendation rules 124 may determine when to use or store electricity in a user's solar panels based on data received from a distributed or onsite generation monitor. In yet another example, optimization recommendation rules 124 may utilize data from multiple electrical source monitors (e.g., electrical usage monitor, distributed or onsite generation monitor, and/or battery storage monitor) to determine the most efficient rate plan for a user given the different sources and uses of energy. In an additional example, optimization recommendation rules 124 recommend new home devices 116 based on a user's energy usage data. While illustrated as including a particular module, optimization recommendation rules 124 may include any suitable information for use in the operation of recommendation module 120.

Service recommendation rules 125 generally refer to logic, rules, algorithms, code, tables, and/or other suitable instructions embodied in a computer-readable storage medium for performing the described functions and operations of recommendation module 120. Generally, service recommendation rules 125 are applied to the analyzed data received from analytics module 106 via network 104. Service recommendation rules 125 facilitate determining service recommendations to make to a user to, for example, alert the user to a need for service for an electrical component or appliance. For example, recommendation module 120, by applying service recommendation rules 125 to the analyzed energy usage data, could determine that a user's A/C unit has been running more than expected. This determination may be made for example, by comparing the A/C unit usage to a user's past energy usage data 119, other users' energy usage data 119, weather pattern data, or any other suitable data source. Upon a determination of a need for service, recommendation module 120 communicates a service recommendation to a user through one or more user devices 102 over network 104. Once the recommendation is communicated to user device 102, a user may accept the service recommendation. User device 102 may then facilitate the execution of the recommendation. For example, if the service recommendation is to provide service to a user's A/C unit, a user could schedule and dispatch a technician through user device 102. In an embodiment, a user, utilizing user device 102 and one or more home devices 116, could unlock the door for the technician and monitor the technician's activities in the home. In an example, the technician, or an entity associated with the technician, could provide additional data regarding the service to recommendation module 120. This data could indicate the need to repair or upgrade another home device 116 or any other suitable electrical component or appliance in the user's home or any other suitable data. While illustrated as including a particular module, service recommendation rules 125 may include any suitable information for use in the operation of recommendation module 120.

Memory 122 may also include forecast development rules 126. Forecast development rules 126 generally refer to logic, rules, algorithms, code, tables, and/or other suitable instructions embodied in a computer-readable storage medium for performing the described functions and operations of recommendation module 120. Generally, forecast development rules 126 are applied to procurement data 202 received from procurement database 200 via network 104. In an embodiment, forecast development rules 126 are applied to energy usage data 119 received via network 104. Forecast development rules 126 may project future usage of electricity users. Forecast development rules 126 may additionally or alternatively make procurement recommendations. In this embodiment, recommendation module 120 applies forecast development rules 126 to customer forecast data 203 and procurement position data 205 to make procurement recommendations. In an embodiment, recommendation module 120 makes recommendations concerning electricity procurement based on past usage data and/or the future projections. While illustrated as including a particular module, forecast development rules 126 may include any suitable information for use in the operation of recommendation module 120.

As illustrated, system 100 may also include computer 132. Computer 132 may be any device that interacts with system 100. Computer 132 could be one or more computers. Computer 132 could be located in recommendation module 120, analytics module 106, and/or any other suitable location in system 100. In an embodiment, computer 132 may interact with analytics module 106, recommendation module 120, or any other suitable component of system 100 via network 104 to request, modify, or receive data. For example, computer 132 may facilitate updating procurement position data 205. Computer 132 may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 100, or any combination of the preceding. Computer 132 may also include a user interface, such as a display, a touchscreen, a microphone, keypad, or other appropriate terminal equipment usable by a user.

In one exemplary embodiment of operation, database 118 receives energy usage data 119 via network 104. For example, home devices 116 and/or an advanced metering system may communicate energy usage data 119 to database 118. As another example, analytics module 106 may communicate some or all of energy usage data 119 to database 118. Next, database 118 communicates energy usage data 119 to recommendation module 120 via network 104. Recommendation module 120 then applies optimization recommendation rules 124 and/or service recommendation rules 125 to energy usage data 119. Recommendation module 120 then determines whether to communicate an optimization and/or service recommendation. For example, recommendation module 120 may determine that a user's HVAC is not functioning properly and requires service or replacement. Recommendation module 120 may then communicate the recommendation to one or more user devices 102. Users may use device 102 to facilitate service or replacement pursuant to the recommendation.

In another exemplary embodiment of operation, system 100 determines customer forecast data 203 and compares customer forecast data 203 to procurement position data 205 to make procurement recommendations. Procurement database 200 may receive procurement position data 205. For example, procurement database 200 may receive procurement position data 205 from computer 132 or any other suitable component of system 100. Procurement database 200 may additionally or alternatively receive procurement data 202 as discussed in relation to FIG. 2. Procurement database 200 may communicate some or all of procurement data 202 to recommendation module 120 via network 104. Recommendation module 120 may apply forecast development rules 126 to determine customer forecast data 203. Recommendation module 120 may communicate customer forecast data 203 to procurement database 200 via network 104. Procurement database 200 may communicate customer forecast data 203 and/or procurement position data 205 to recommendation module 120. Recommendation module 120, by applying forecast development rules 126 or any other suitable rules, may compare customer forecast data 203 to procurement position data 205 to determine whether a procurement position is short or long. For example, if a procurement position is short, an electricity retail provider may need to, for example, acquire additional electricity and/or offer an incentive to consumers to curtail or cease electricity usage for a period of time. If the procurement position is long, the electricity provider may need to sell or otherwise offload excess electricity. Once recommendation module 120 determines whether the procurement position is short or long, recommendation module 120 may communicate the recommendation to procurement database 200, computer 132, or any other suitable component of system 100. The retail electricity provider may act on the procurement recommendation. For example, the retail electricity provider may acquire additional electricity, offer an incentive, offload electricity, and/or otherwise adjust its procurement position in any suitable manner. As another example, the retail electricity provider may offer an incentive to a consumer or group of consumers to curtail or cease electricity usage for a period of time. If one or more consumers opts-in to the incentive (e.g., by indicating a desire to opt in using one or more user devices 102), the retail electricity provider, using computer 132 or any other suitable component of system 100, may update procurement position data 205. In an embodiment computer 132 may update procurement position data 205 automatically. If, however, no consumer opts-in to the incentive, procurement position data 205 may not be updated. After adjusting the procurement position, computer 132 and/or any other suitable component of system 100 may update procurement position data 205.

A component of system 100 may include an interface, logic, memory, and/or other suitable element. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer readable storage medium or any other suitable tangible medium, and may perform operations when executed by a computer. Certain logic, such as a processor, may manage the operation of a component. Examples of a processor include one or more computers, one or more microprocessors, one or more applications, and/or other logic.

While FIG. 1 illustrates components of system 100 operating within a residential home, the disclosure also contemplates the components operating in any suitable context. For example, components of system 100 may operate in a business, a warehouse, an office building, or any other suitable building structure. Further, components of system 100 are not limited to building structures. For example, components of system 100 may operate within a vehicle, a center pivot, or any other suitable context that uses energy. Furthermore, while recommendation module 120 is described as providing recommendation notifications to users of system 100, this disclosure further contemplates recommendation module 120 operating automatically to provide energy optimization, service, and/or energy procurement based on rules 124-126. Additionally, components of system 100 may be device and system agnostic, allowing components of system 100 to be compatible in a plurality of energy providers' systems.

Figure 2:
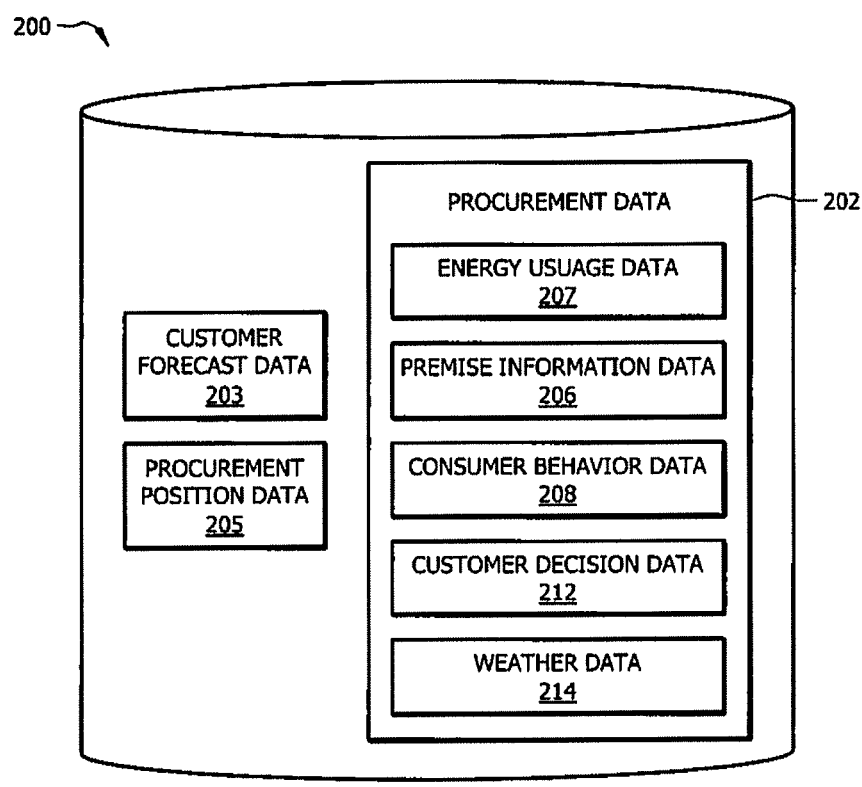
FIG. 2 further illustrates a procurement database.

FIG. 2 further illustrates procurement database 200. As discussed, procurement database 200 comprises procurement data 202, customer forecast data 203, and/or procurement position data 205. Generally, procurement data 202 comprises subsets of data. In the illustrated embodiment, procurement data 202 comprises energy usage data 207, premise information data 206, consumer behavior data 208, customer decision data 212, and weather data 214. Procurement data 202 may be supplied by energy consumers, one or more third party sources, or any other suitable data source.

In an embodiment, energy usage data 207 may be identical to energy usage data 119. As discussed in relation to FIG. 1, energy usage data 207 may comprise device data 204 and/or AMS data 210. Energy usage data 207 may be received from database 118, analytics module 106, recommendation module 120, any other suitable component of system 100, and/or one or more third party data sources. As discussed in relation to energy usage data 119, energy usage data 207, in general, contains information regarding a user's electricity usage, usage habits, preferences, or any other suitable data Procurement data 202 may comprise premise information data 206. Generally, premise information data 206 comprises information about the physical attributes of a structure. For example, premise information data 206 may indicate the size of a structure, the year it was built, its location, and/or its energy efficiency rating. In an embodiment, premise information data 206 may comprise the geographical location of a premise. Premise information data 206 may comprise information regarding electrical components and/or appliances in and/or near a premise. Premise data may be received automatically from third a party source, such as a city's appraisal district, a real estate database, or any other suitable data source.

In the illustrated embodiment, procurement data 202 comprises consumer behavior data 208. Generally, consumer behavior data 208 comprises information regarding a consumer's or group of consumers' energy usage habits. For example, consumer behavior data 208 may comprise information regarding a consumer's past energy usage. This may provide insight to the consumer's future energy usage. As another example, consumer behavior data 208 may indicate that a consumer is likely to use more or less energy in the future. For example, consumer behavior data 208 could indicate that a consumer is going on vacation, going away for business, beginning a school term, or starting a new job. This information tends to indicate that the consumer will use less energy in the future. As another example, consumer behavior data 208 could indicate that a consumer purchased new electrical components such as a gaming system, home theater, hot tub, electrical car, or any other electrical component. In this example, consumer behavior data 208 may be received automatically from a financial entity such as a bank or credit card company from user device 102, from a retail outlet, or any other suitable source. Consumer behavior data 208 may also indicate that a consumer is expecting a greater number of people in the consumer's home or business, stopped working, is out of school for the summer, or is hosting a dinner party or social gathering. This information tends to indicate that the consumer will use more energy in the future. In an embodiment, consumer behavior data 208 may be provided by the consumer, a surveyor, or any other suitable person. In an embodiment, consumer behavior data 208 may be received automatically from any suitable source such as user device 102, from a smart phone application, or any suitable device synced to one or more homes devices 116. For example, consumer behavior data 208 may be determined through a consumer's social media account or any other suitable source.

In the illustrated embodiment, procurement data 202 may comprise customer decision data 212. Generally, customer decision data 212 comprises information regarding opt-in incentives. For example, an electrical service provider, or any other suitable entity or person, may offer incentives to guide consumer behavior. For example, an electrical service provider may request a consumer to curtail or cease energy usage for a certain time period. In another example, the electrical service provider may request to purchase stored energy from the consumer. If a consumer agrees to comply with the request, the consumer may indicate compliance and receive the incentive. An incentive, for example, could comprise a lower electricity rate, cash reward, gift card, gift, tickets to concerts, plays, or sporting events, or any other reward to incentivize consumer behavior. An indication of compliance may indicate that a consumer will use less energy in the near future. In another example, an indication of compliance may indicate that the entity, or any other suitable entity, offering the incentive may receive electricity from the consumer. An incentive may be communicated to a consumer through device 102, via email, a smart phone application, a text message, over the phone, through an internet browser, or any other suitable method of communication. In an embodiment, a consumer may not be required to opt-in to an incentive. For example, an electrical provider may provide an incentive to use less than a certain amount of energy in a certain time period. If a consumer complies, the consumer may receive the incentive. In an embodiment, customer decision data 212 may facilitate determining what incentives for an entity or person to provide to a consumer or group of consumers. For example, system 100, alone or in conjunction with any other suitable system, determines that a retailer may need to procure additional electricity to supply its consumer base. Rather than procuring additional electricity, which may be costly, system 100 may offer an incentive to for consumers to cease or curtail electricity use or provide stored electricity to the retailer. In an embodiment, customer decision data 212 may indicate that a consumer may use more or less energy in the future Procurement data 202 may comprise weather data 214. Generally, weather data 214 comprises weather forecast information. For example, weather data 214 may comprise temperature information, or any other weather related information, for a certain time period. This information may indicate whether consumers will use more or less energy. For example, if a heat wave is expected to go through a specific geographical area, weather data 214 may indicate that consumers within that geographical area may use more energy in the near future. Weather data 214 may be received automatically from one or more third parties such as a weather database or any other suitable source.

Procurement database 200 may comprise customer forecast data 203. Customer forecast data 203 indicates the amount of energy that a consumer or group of consumers may consume in the future. System 100 may utilize customer forecast data 203 to provide procurement recommendations. Procurement database 200 may receive customer forecast data 203 from recommendation module 120 or any other suitable component of system 100. In general, recommendation module 120 applies forecast development rules 126 to procurement data 202 to determine customer forecast data 203. Recommendation module 120 may communicate customer forecast data 203 to procurement database 200, computer 132, or any other suitable component of system 100 via network 104.

Procurement database 200 may comprise procurement position data 205. In general, procurement position data 205 indicates a retail electricity provider's current position. For example, procurement position data 205 may indicate the amount of electricity that a retail electricity provider has purchased, agreed to purchase, or otherwise acquired for a given time period. In an embodiment, a user utilizing computer 132 may communicate procurement position data 205 to procurement database 200 via network 104. System 100 may apply forecast development rules 126 to procurement position data 205 and customer forecast data 203 to recommend that a retail energy provider acquire or sell electricity.

Modifications, additions, or omissions may be made to procurement database 200 as depicted in FIG. 2. The system may include additional or fewer components. For example, procurement data 202 may comprise additional data sets. As another example, procurement data 202 may comprise fewer data sets. Although illustrated as an independent database, procurement database 200 may be located within any suitable component of system 100. For example, procurement data 202 may be stored within database 118, analytics module 106, recommendation module 120, or any other suitable location.

To better understand the functions of system 100, example methods of home automation will be used. However, it is understood that system 100 may be used in a variety of contexts and areas to help recommendation module 120, analytics module 106, user devices 102, database 118, procurement database 200, and home devices 116 communicate data in an efficient matter, such as communicating data and transmitting optimization recommendations, service recommendations, and/or procurement recommendations.

Figure 3:
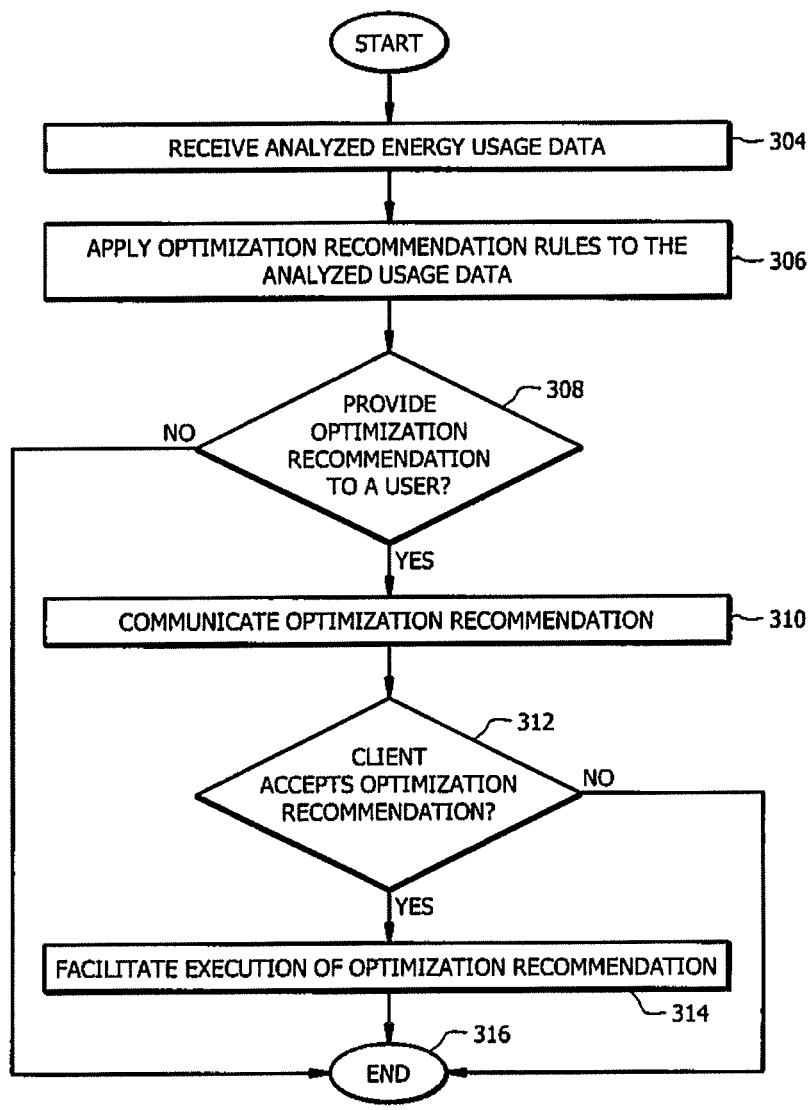
FIG. 3 illustrates an example method for home automation.

FIG. 3 illustrates an example method for home automation. In some embodiments, home devices 116 may communicate energy usage data 119 to database 118 via network 104. Database 118 then may communicate energy usage data 119 to analytics module 106. In another embodiment, home devices 116 may communicate energy usage data 119 directly to analytics module 106. In general, energy usage data 119 is data received from home devices 116. For example, energy usage data 119 may contain information regarding a consumer's electricity usage, usage habits, preferences, or any other suitable data provided by home devices 116. In general, database 118 communicates usage data 119 to analytics module 106 via network 104.

Analytics module 106 may analyze energy usage data 119. For example, analytics module 106 may aggregate energy usage data 119 provided over a period of time and/or received from a plurality of home devices 116. Analytics module 106 may also transform the aggregated usage data into a format that may be processed by recommendation module 120. For example, recommendation module 120 may require data in a certain format, and analytics module 106 may transform the data into that format. As a further example, analytics module 106 may determine at what time or rate electrical components or appliance are being utilized. Analytics module 106 may determine this by receiving data from home devices 116.

The method begins at step 304 when recommendation module 120 receives analyzed energy usage data. Recommendation module 120 may receive the analyzed energy usage data from analysis module 106 via network 104. Recommendation module 120 may also (or in addition) receive the analyzed energy usage data from any other suitable data source. Recommendation module 120 applies optimization recommendation rules 124 at step 306. Optimization recommendation rules 124 facilitate determining recommendations to make to a user to improve electricity usage efficiency or suggest to the client upgrades or additional home devices 116 that will provide greater convenience or efficiency. For example, optimization recommendation rules 124 facilitate determining, based on a user's electrical usage data, that a different electrical service plan would benefit the user. In an additional example, optimization recommendation rules 124 recommend new home devices 116 based on a user's energy usage data.

In step 308, system 100 determines whether recommendation module 120 determined an optimization recommendation to provide to a user. In some instances, home devices 116 may be operating efficiently and a user's electrical usage and plan is optimized. In these instances, an optimization recommendation may not be necessary. If recommendation module 120 does not determine an optimization recommendation, the method proceeds to step 316 where the method is terminated.

If recommendation module 120 determines an optimization recommendation, however, the method proceeds to step 310 where the recommendation is communicated to a user via user device 102 over network 104. As discussed above, an optimization recommendation may be determined using any suitable criteria and communicating any suitable components to receive and analyze the data.

One or more user devices 102 receive the recommendation. For example, recommendation module 120 may recommend switching service plans or purchasing or upgrading a home device 116. A user then has the option to accept the recommendation at step 312. If the user does not accept the recommendation, the method proceeds to step 316 where the method is terminated. If the user does accept the recommendation, the method proceeds to step 314.

At step 314, user device 102, and/or any other suitable components of system 100, facilitates execution of the recommendation. For example, when the recommendation is to switch service plans, a user may change plans through user device 102 and the change is processed and configured with the retail electricity provider. In another example, when the recommendation is to purchase or upgrade a device 116, the user may be able to purchase the device through user device 102. Next, the method proceeds to step 316 where the method is terminated.

Modifications, additions, or omissions may be made to the method depicted in FIG. 3. The method may include more, fewer, or other steps. For example, recommendation module 120 may apply service recommendation rules 125 to the analyzed data. In this example, a user may receive a service recommendation and recommendation module 120 facilitates scheduling a technician to complete the service through user device 102. As yet another example, steps may be performed in parallel or in any suitable order.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

Figure 4:
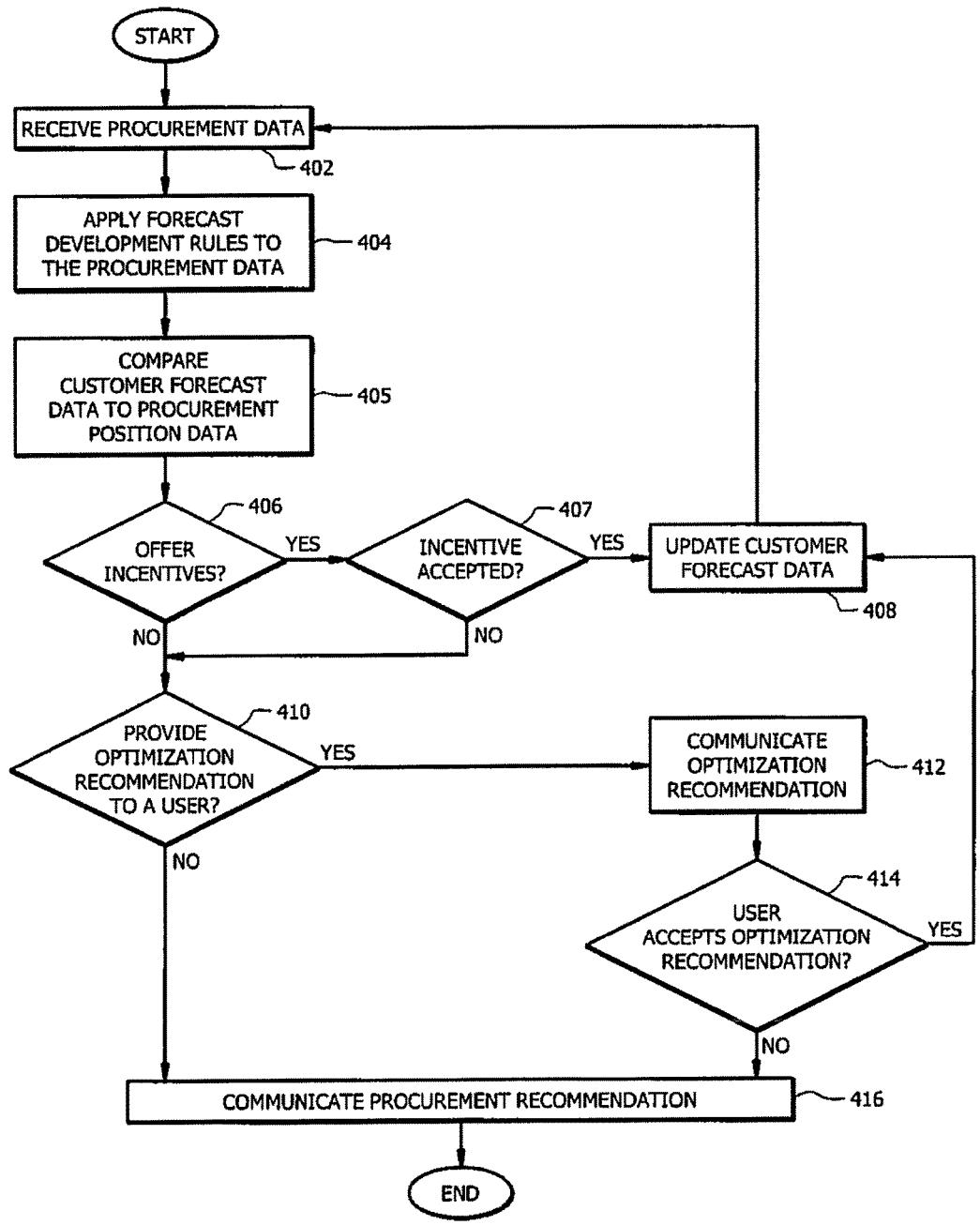
FIG. 4 illustrates an example method for energy procurement.

FIG. 4 illustrates an example method for energy procurement. In some embodiments, recommendation module 120 receives some or all of procurement data 202 from procurement database 200. In general, recommendation module 120 utilizes forecast development rules 126 to provide procurement recommendations. For example, recommendation module 120 may provide a procurement recommendation to a retail electrical provider.

The method begins at step 402 when recommendation module 120 receives procurement data 202. Procurement database 200 may communicate some or all of procurement data 202 to recommendation module 120 via network 104. Recommendation module 120 may also (or in addition) receive procurement data 202 from any other suitable data source. Procurement data 202 may comprise device data 204, premise information data 206, consumer behavior data 208, AMS data 210, customer decision data 212, and/or weather data 214.

Recommendation module 120 applies forecast development rules 126 to procurement data 202 at step 404. Forecast development rules 126 may project future usage of electricity by users. Recommendation module 120 may communicate the projection to procurement database 200 where it is stored as customer forecast data 203.

At step 405, recommendation module 120 compares customer forecast data 203 to procurement position data 205. This comparison may indicate whether a retail electricity provider's current procurement position is long or short. For example, if the current procurement position is short, the retail electricity provider may need to acquire additional energy or offer an incentive to consumers to use less energy. If the procurement position is short, the retail energy provider may need to sell excess energy.

At step 406, recommendation module 120 determines whether to offer an incentive. In an embodiment, forecast development rules 126 facilitate whether to offer an incentive. Recommendation module 120 may determine to offer an incentive to an individual consumer, all consumers, consumers in a specific geographical area, all commercial consumers, all residential consumers, or any other suitable group of consumers. For example, an electricity service provider may request a consumer to curtail or cease energy usage for a certain time period. In another example, the electrical service provider may request to purchase stored energy from the consumer. If a consumer agrees to comply with the request, the consumer may indicate compliance and receive the incentive. An incentive, for example, could comprise a lower electricity rate, cash reward, gift card, gift, tickets to concerts, plays, or sporting events, or any other reward to sway consumer behavior. Next, the system proceeds to step 407 where system 100 determines whether one or more consumers opted in to the incentive program. If one or more consumers opts in to the incentive program, the method proceeds to step 408 where customer forecast data 203 is updated before returning to step 402. In some embodiments, however, consumers may not need to opt-in to receive the benefits of an incentive program.

If recommendation module 120 does not offer an incentive or an offered incentive is not accepted, the method proceeds to step 410 where recommendation module 120 determines whether to provide an optimization recommendation to a consumer or group of consumers. For example, optimization recommendation rules 124 may be used to determine whether to offer an optimization recommendation. Recommendation module 120 may use energy usage data 119, energy usage data 207, and/or device data 204 to determine whether to offer an optimization recommendation. If system 100 does not provide to provide an optimization recommendation, the method proceeds to step 416 where a procurement recommendation is communicated. For example, the procurement recommendation may be communicated to a retail electricity provider, any other suitable entity, or any other suitable person or group of people. Next the method ends.

One or more user devices 102 receive the optimization recommendation at step 412. For example, recommendation module 120 may recommend switching service plans or servicing, purchasing or upgrading a home device 116. A user then has the option to accept the recommendation at step 414. If the user accepts the recommendation, the method proceeds to step 408 where customer forecast data 203 is updated before returning to step 402. If the user does not accept the recommendation, the method proceeds to step 416 where the system communicates a procurement recommendation before the method is ended. For example, the procurement recommendation may indicate whether a retail energy provider's position is long or short.

Certain embodiments of the present disclosure may provide one or more technical advantages. A technical advantage of one embodiment includes increasing the efficiency of electricity usage using devices within or near a building or other structure. As another example, a technical advantage of one embodiment includes improving a user's convenience in operating devices within a building. As yet another example, a technical advantage includes creating an interaction between devices and service providers, which improves a user's experience. As a further example, a technical advantage of one embodiment includes improving the decisioning process for electricity procurement by providing data regarding energy usage.

Other technical advantages of the present disclosure will be readily apparent to one skilled in the art from the following figures, descriptions, and claims. Moreover, while examples of specific advantages have been enumerated above, various embodiments may include all, some, or none of the enumerated advantages.

Modifications, additions, or omissions may be made to the method depicted in FIG. 4. The method may include more, fewer, or other steps. For example, a consumer may not need to indicate acceptance to opt-in to an incentive program. As a further example, system 100 may not update customer forecast data 203 with information about incentive offerings and/or optimization recommendations. As yet another example, system 100 may apply service recommendation rules 125 instead of, or in addition to, optimization recommendation rules 124. As yet another example, steps may be performed in parallel or in any suitable order. While the disclosure discusses a retail energy provider, system 100 may be utilized by any other type of energy provider or any other entity.

What is claimed is:

1. A system, comprising:
    an interface, operable to receive analyzed energy usage data, the analyzed energy usage data comprising information determined by one or more hardware home automation devices;
    a processor, operable to:
        apply optimization recommendation rules to the energy usage data;
        calculate a first optimization recommendation, the first optimization recommendation based on the analyzed energy usage data and the optimization recommendation rules;
    upon calculation of the first optimization recommendation, the interface further operable to communicate the first optimization recommendation to a user and receive a response to the first optimization recommendation;
    the processor is automated to calculate a second optimization recommendation based on:
        consumer preference data comprising the received response to the first optimization recommendation;
        the analyzed energy usage data;
        the optimization recommendation rules;
    upon calculation of the second optimization recommendation, the interface is further operable to communicate the second optimization recommendation to a user and receive a response to the second optimization recommendation;
    wherein:
        at least one of the first optimization recommendation and the second optimization recommendation comprises a recommendation to acquire a new hardware home automation device; and
        the system is configured to facilitate at least one of scheduling on-site installation of the new hardware home automation device and remotely providing an installer access to a structure.

2. The system of claim 1, wherein at least one of the first optimization recommendation and the second optimization recommendation is communicated to the user on a user device and the user device prompts the user to accept or decline the communicated optimization recommendation.

3. The system of claim 2, wherein the user device facilitates scheduling on-site installation of the new hardware home automation device.

4. The system of claim 3, wherein the user device facilitates unlocking a lock to provide an installer access to a structure.

5. The system of claim 1, wherein at least one of the first optimization recommendation and the second optimization recommendation comprises a recommendation to modify an electricity plan.

6. The system of claim 1, wherein the one or more hardware home automation devices comprises one or more of a security camera, a thermostat, a garage door opener, a pool pump, a lock, a light bulb, and an electricity usage monitor.

7. A method, comprising:
    receiving, through an interface, analyzed energy usage data, the analyzed energy usage data comprising information determined by one or more hardware home automation devices;
    applying, using a processor, optimization recommendation rules to the energy usage data;
    calculating, using the processor, a first optimization recommendation, the first optimization recommendation based on the analyzed energy usage data and the optimization recommendation rules;
    upon calculating the first optimization recommendation, communicating the first optimization recommendation to a user;
    receiving a response to the first optimization recommendation;
    calculating a second optimization recommendation based on:
        consumer preference data comprising the received response to the first optimization recommendation;
        the analyzed energy usage data;
        the optimization recommendation rules;
    upon calculating the second optimization recommendation, communicating the second optimization recommendation to a user, wherein at least one of the first optimization recommendation and the second optimization recommendation comprises a recommendation to acquire a new hardware home automation device;
    receiving a response to the second optimization recommendation; and
    facilitating at least one of scheduling on-site installation of the hardware home automation device and remotely providing an installer access to a structure.

8. The method of claim 7, wherein at least one of the first optimization recommendation and the second optimization recommendation is communicated to the user on a user device and the user device prompts the user to accept or decline the communicated optimization recommendation.

9. The method of claim 8, wherein the user device facilitates scheduling on-site installation of the new hardware home automation device.

10. The method of claim 9, wherein the user device facilitates unlocking a lock to provide an installer access to a structure.

11. The method of claim 7, wherein at least one of the first optimization recommendation and the second optimization recommendation comprises a recommendation to modify an electricity plan.

12. The method of claim 7, wherein the one or more hardware home automation devices comprises one or more of a security camera, a thermostat, a garage door opener, a pool pump, a lock, a light bulb, and an electricity usage monitor.

13. A method, comprising:
    receiving, through an interface, analyzed energy usage data, the analyzed energy usage data comprising information determined by one or more hardware home automation devices;

applying, using a processor, service recommendation rules to the energy usage data;
calculating, using the processor, a first service recommendation, the first service recommendation based on the analyzed energy usage data and the service recommendation rules;
upon calculating the first service recommendation, communicating the first service recommendation to a user;
receiving a response to the first service recommendation;
calculating a second service recommendation based on:
consumer preference data comprising the received response to the first service recommendation;
the analyzed energy usage data;
the service recommendation rules;
upon calculating the second service recommendation, communicating the second service recommendation to a user, wherein at least one of the first service recommendation and the second service recommendation comprises a recommendation to repair at least one of the one or more hardware home automation devices;
receiving a response to the second service recommendation; and
facilitating at least one of scheduling on-site repair of at least one of the one or more hardware home automation devices and remotely providing an installer access to a structure.

14. The method of claim 13, wherein at least one of the first service recommendation and the second service recommendation is communicated to the user on a user device and the user device prompts the user to accept or decline the communicated service recommendation.

15. The method of claim 14, wherein the user device communicates with a third party to schedule on-site service of at least one of the one or more new hardware home automation device.

16. The method of claim 15, wherein the user device communicates with the one or more hardware home automation devices to provide a service technician access to a building.

17. The method of claim 13, wherein the one or more hardware home automation devices comprises one or more of a security camera, a thermostat, a garage door opener, a pool pump, a lock, a light bulb, and an electricity usage monitor.

18. A system, comprising:
an interface, operable to receive analyzed energy usage data, the analyzed energy usage data comprising information determined by one or more hardware home automation devices;
a processor, operable to:
apply service recommendation rules to the energy usage data;
calculate a first service recommendation, the first service recommendation based on the analyzed energy usage data and the service recommendation rules;
upon calculating the first service recommendation, the interface further operable to communication the first service recommendation to a user and receive a response to the first service recommendation;
the processor is automated to calculate a second service recommendation based on:
consumer preference data comprising the received response to the first service recommendation;
the analyzed energy usage data;
the service recommendation rules;
upon calculation of the second service recommendation, the interface further operable to communicate the second service recommendation to a user and receive a response to the second service recommendation;
wherein:
at least one of the first service recommendation and the second service recommendation comprises a recommendation to repair at least one of the one or more hardware home automation devices; and
the system is configured to facilitate at least one of scheduling on-site repair of at least one of the one or more hardware home automation devices and remotely providing an installer access to a structure.

19. The system of claim 18, wherein at least one of the first service recommendation and the second service recommendation is communicated to the user on a user device and the user device prompts the user to accept or decline the communicated service recommendation.

20. The system of claim 19, wherein the user device communicates with a third party to schedule on-site service of at least one of the one or more hardware home automation device.

21. The system of claim 20, wherein the user device communicates with the one or more hardware home automation devices to provide a service technician access to a building.

22. The system of claim 18, wherein the one or more hardware home automation devices comprises one or more of a security camera, a thermostat, a garage door opener, a pool pump, a lock, a light bulb, and an electricity usage monitor.

* * * * *